United States Patent [19]

Grinberg et al.

[11] Patent Number: 4,800,519

[45] Date of Patent: Jan. 24, 1989

[54] OPTICAL DATA PROCESSING SYSTEMS AND METHODS FOR MATRIX INVERSION, MULTIPLICATION, AND ADDITION

[75] Inventors: Jan Grinberg, Los Angeles; Yuri Owechko, Newberry Park; Bernard H. Soffer, Pacific Palisades; Emanuel Marom, Canoga Park, all of Calif.

[73] Assignee: Hughes Aircraft Company, Los Angeles, Calif.

[21] Appl. No.: 836,675

[22] Filed: Mar. 5, 1986

[51] Int. Cl.$^4$ ........................ G06G 9/00; G02F 1/133; G02F 1/05; G02F 1/03

[52] U.S. Cl. .................................... 364/822; 364/841; 364/845; 364/837

[58] Field of Search ............... 364/822, 606, 845, 841, 364/837; 350/335, 355, 353, 160 LC, 96.11, 96.14, 96.16, 162.12; 340/324 M

[56] References Cited

U.S. PATENT DOCUMENTS

| | | | |
|---|---|---|---|
| 3,989,355 | 11/1976 | Wilmer | 350/335 |
| 4,569,033 | 2/1986 | Collins et al. | 364/845 |
| 4,603,398 | 7/1986 | Bocker et al. | 364/845 |
| 4,607,344 | 8/1986 | Athale et al. | 364/845 X |
| 4,620,293 | 10/1986 | Schlant et al. | 364/845 |
| 4,633,427 | 12/1986 | Bocker | 364/845 X |

FOREIGN PATENT DOCUMENTS 8605608 9/1986 PCT Int'l Appl. .

OTHER PUBLICATIONS

Applied Optics, vol. 24, No. 23, Dec. 1, 1985, Nakano et al., "Realtime Processing of the Multiple Matrix Product Using an Incoherent Optical System" see FIG. 10, pp. 4239–4240.

Applied Optics, vol. 22, No. 16, Aug. 15, 1983, Bocker, "Advanced Rubic Cube Processor", see FIG. 1, pp. 2401–2402.

*Primary Examiner*—Joseph Ruggiero
*Assistant Examiner*—Charles B. Meyer
*Attorney, Agent, or Firm*—V. D. Duraiswamy; A. W. Karambelas

[57] ABSTRACT

Optical data processing systems are described for processing four NxN matrices A, B, C, D to calculate the expression $CA^{-1}B+D$. Multi-cell spatial light modulators are employed in conjunction with control circuits to perform matrix inversion, multiplication and addition.

17 Claims, 5 Drawing Sheets

OPTICAL DATA PROCESSING SYSTEMS AND METHODS FOR MATRIX INVERSION, MULTIPLICATION, AND ADDITION

FIELD OF INVENTION

The present invention generally relates to optical computing and data processing systems and, in particular to multistage lensless optical data processors capable of matrix inversion.

BACKGROUND OF THE INVENTION

Optical processing of vector and matrix data is known for its potentially highly effective computational performance capabilities and its natural adaptability to computationally intensive image processing. Images, or other spatially relatable data, may be treated as matrices composed of raster or vector scans of data elements that, at their real or effective resolution limit, are generally referred to as pixels. An ordinary image is typified by an analog picture frame taken as a cross section of an optical beam formed of a continuous series of such images. Each analog image frame typically contains an effectively continuous spatially distributed array of pixel data. Alternatively, discrete matrix data may be impressed onto a data beam by spatially modulating the cross section of a data beam in terms of, for example, either its localized intensity or polarization vector.

In any case, optical processing is of great potential value due to its fundamentally parallel processing nature. The parallelism, of course, arises due to the processing of complete images at a time. As each pixel is a separate datum, the volume of data processed in parallel is generally equivalent to the effective resolution of the image. Additionally, optical processing has the virtue of processing data in the same format that it is conventionally obtained. Typically, and for such applications as image enhancement and recognition, the data to be processed is generally obtained as a single image or as a raster scan of an image frame.

Optical data processors of the type described above are disclosed in U.S. patent application Ser. No. 502,981, filed June 10, 1983, entitled Method of Performing Matrix by Matrix Multiplication, invented by Jan Grinberg and Frederick Yamagishi; in U.S. patent application Ser. No. 713,064, filed Mar. 18, 1985, entitled Programmable Multistage Lenseless Optical Data Processing System, invented by Jan Grinberg and Bernard H. Soffer, and U.S. patent application Ser. No. 713,063, filed Mar. 18, 1985, entitled Programmable Methods of Performing Comlex Optical Computations Using Data Processing System, invented by Jan Grinberg, Graham R. Nudd, and Bernard H. Soffer.

A limitation in the use of these optical data processors is that they are not designed to perform matrix inversion. The prior art mechanizations are, for the most part, limited to matrix multiplication, correlation, and convolution.

Accordingly, it is an object of the present invention to provide new and improved optical data processing systems capable of matrix inversion. Potentially then, an optical processor may receive data directly without conventional or other intermediate processing. Since the informative value of image data increases with the effective resolution of the image and the number of images considered, the particular and unique attributes of optical processing become quite desireable.

Conventionally, optical processing is performed by projecting an image to be processed through a selected spatial mask onto an appropriate optical detector. A temporally variable mask for optical processors has been realized as a one-dimensional spatial light modulator (SLM) that, through electronic activation, effects selective alteration of the spatially distributed data impressed on a data beam by the mask. A typical SLM is in the form of a solid electro-optical element activated by a spatially distributed array of electrodes. The modulating image is effectively formed by separately establishing the voltage potential of each of the electrodes at an analog voltage corresponding to the respective intended data values.

It is another object of the present invention to provide an optical data processing system capable of matrix inversion, multiplication, addition, and combinations of these functions.

SUMMARY OF THE INVENTION

The foregoing and other objects of the invention are accomplished by providing an optical data processor for processing four N×N matrices A, B, C and D to calculate the expression $CA^{-1}B+D$, where $A^{-1}$ signifies the inverse of A. The processor includes a first modulator for spatially modulating an optical beam in response to a signal representing a first number, and having a first set of modulation areas arranged as 2N−1 rows. A second modulator is provided for spatially modulating the optical beam exiting the first modulator in response to signals representing elements in a second row of 2N−1 numbers, and has a second set of modulation areas arranged as 2N−1 columns. A third modulator spatially modulates the optical beam exiting the second modulator in response to signals representing elements in a third column of 2N−1 numbers, and has a third set of modulation areas arranged as 2N−1 rows.

A light detector is included having $(2N-1)^2$ light detection areas arranged as a matrix array of 2N−1 rows and 2N−1 columns, where the detection areas provide an array of detector signals in response to light modulated by respective modulation areas of the first, second and third modulators. Each element in the array of detector signals being proportional, respectively, to the product of the first number, a respective element in the second row of numbers, and a respective element in the third column of numbers.

An accumulator is provided for storing, adding, and shifting the array of detector signals, and has $(2N)^2$ locations arranged as an accumulator matrix array of 2N rows and 2N columns.

The elements of the matrix A are stored in the upper left quadrant of the accumulator array; the elements of the matrix B in the upper right quadrant; the elements of the matrix D in the lower right quadrant; and the polarity inverted elements of the matrix C in the lower left quadrant of the accumulator array.

The optical processor further includes control circuitry for:

(a) providing the negative reciprocal of the upper left-most location of the accumulator array as the first number to the first modulator;

(b) providing the 2N−1 right-most elements of the top row of the accumulator array as the second row of numbers to the second modulator;

(c) providing the 2N−1 bottom-most elements of the left column of the accumulator array as the third column of numbers to the third modulator;

(d) adding the elements of the array of detector signals from corresponding elements in the portion of the accumulator array comprising the 2N−1 right-most columns and the 2N−1 bottom-most rows;

(e) shifting the contents of the accumulator array one column to the left and one row to the top; and (f) repeating the operations in (a) through (e) N−1 times, whereby the expression $CA^{-1}B+D$ is provided in the upper left quadrant of the accumulator array.

By proper choice of the matrices A, B, C, D, the invention can be utilized to perform matrix inversion, multiplication, addition, or combinations of the above. Other objects, features and advantages of the invention will become apparent from a reading of the specification when taken in conjunction with the drawings in which like reference numerals refer to like elements throughout the several views.

DESCRIPTION OF THE PREFERRED EMBODIMENTS

Figure 1:
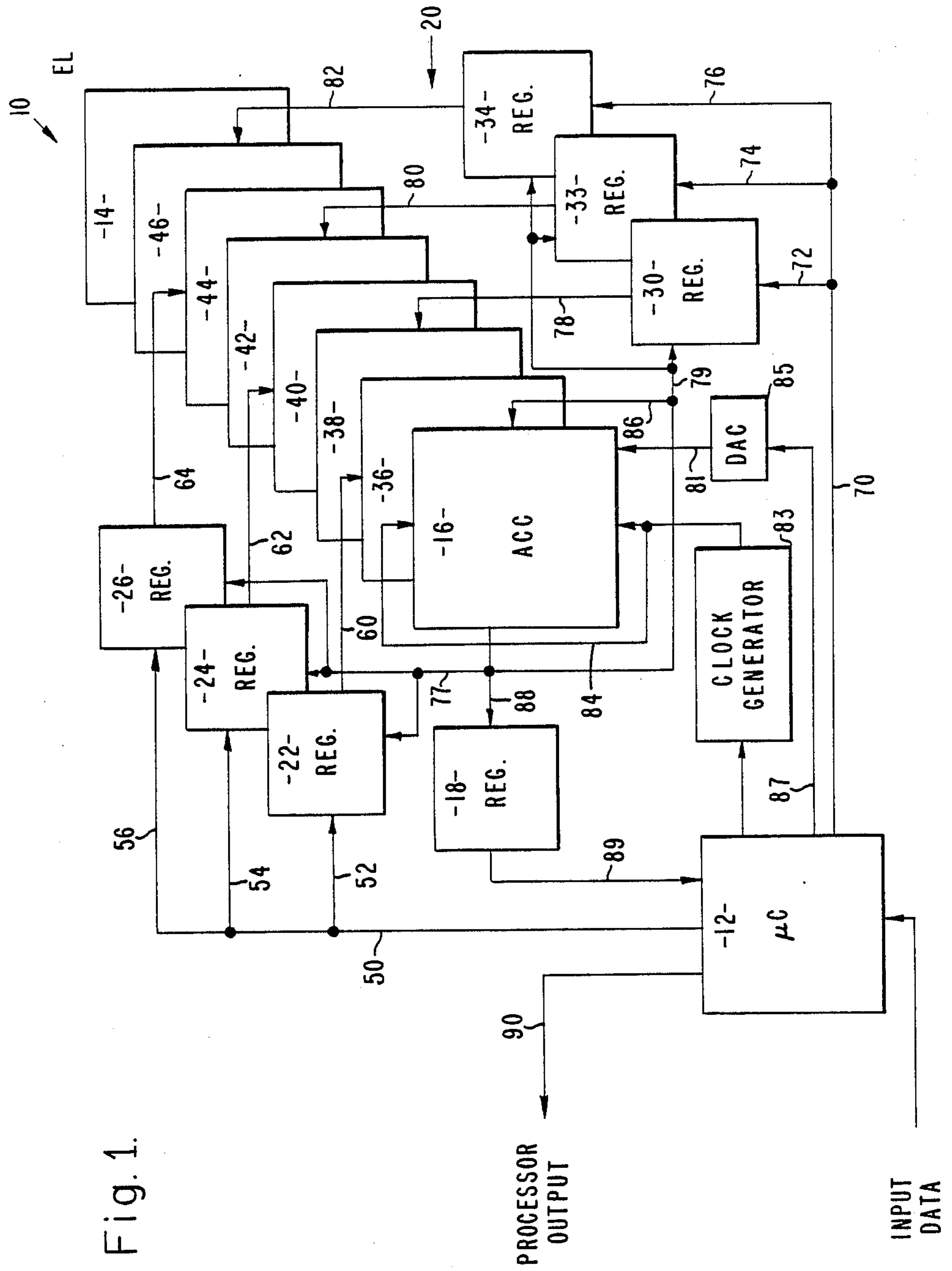
FIG. 1 is a block diagram of an optical data processing system in accordance with the present invention.

The generalized system embodiment for use with the present invention, indicated by the reference numeral 10, is shown in FIG. 1. In particular, the preferred multistage optical data processor (ODP), generally indicated by the reference numeral 20, is operatively supported by a microcontroller 12 and interface registers 18, 22, 24, 26, 30, 32 and 34. The principal operative components of the ODP are shown in FIG. 1 as including a flat panel or LED light source 14, matrix array accumulator 16 (also referred to as a detector array), and a plurality of spatial light modulators (SLMs) 36, 38, 40, 42, 44 and 46. Preferably, the light source 14, accumulator 16 and the SLMs 36, 38, 40, 42, 44, 46 are provided in closely adjacent parallel planes with respect to one another such that a relatively uniform beam sourced by the light source 14 travels through each of the spatial light modulators in succession and is ultimately received by the accumulator 16.

The light beam is effectively used as a data transport mechanism acquiring data provided by each of the spatial light modulators that is subsequently delivered to the accumulator 16. The operation of each of the spatial light modulators can be explained in terms of their spatial transmissivity variation with respect to corresponding spatially distributed activating voltage potentials. To a first approximation at least, the light amplitude transmissivity of a spatial light modulator is directly proportional to the applied voltage potential. Thus, the combined transmissivity (TO) of two serially coupled spatial light modulators is proportional to the product of the respective transmissivities T1, T2 of the spatial light modulators. The combined transmissivity T0 can thus be written as:

$$T0=T1\times T2 \quad (1)$$

$$T0=C\times D\times V1\times V2 \quad (2)$$

V1 and V2 are the respectively applied voltage potentials, and C and D are the transmissivity to applied voltage coefficients for the respective spatial light modulators. Where an extended series of spatial light modulators are serially coupled, in accordance with the present invention, the combined transmissivity T0 of the multistage spatial light modulator stack is proportional to the product of the respective transmissivitives of the individual spatial light modulators. A light beam sourced by the flat panel 14 can thus be directed to acquire spatially distributed data corresponding to the spatially distributed relative transmissivities of each of the spatial light modulators 36, 38, 40, 42, 44 and 46.

In accordance with the preferred embodiment of the optical processor used in accordance with the present invention, spatially relatable data is provided to the spatial light modulators 36, 38, 40, 42, 44 and 46 via the interface registers 22, 24, 26, 30, 32 and 34. These registers preferably provide high speed data storage and signal conditioning. They may also include arithmetic processors to perform functions such as numerical inversion. As will be discussed in greater detail below, the stack of spatial light modulators preferably includes a plurality of one-dimensional spatial light modulators. As shown in FIG. 1, one-dimensional spatial light modulators 36, 38, 40, 42, 44 and 46 are coupled to respective registers 22, 30, 24, 32 and 26 via interface data lines 60, 78, 62, 80, 64 and 82.

The interface registers 22, 24, 26, 30, 32 and 34 in turn preferably receive data in a parallel form from the accumulator 16 via busses 77 and 79. The microcontroller 12 via the processor control buses 50, 70 provides the control signals. While the processor control buses 50, 70 are shown as separate and respectively connected to the registers by the register control lines 52, 54, 56, 72, 74 and 76, the interface registers may alternately be coupled via control multiplexers to a single, common control bus driven by the microcontroller 12. In either case, however, it is essential only that the microcontroller 12 possess sufficient control over the registers 22, 24, 26, 30, 32 and 34 to selectively provide its predetermined data thereto.

The optical data processor system 10 is completed with the provision of the output register 18 coupled between the accumulator 16 and the controller 12. The accumulator 16 itself may be included as part of a matrix array of photosensitive devices 17 capable of converting incident light intensity into a corresponding voltage potential (or electrical charge) representative of the data beam at an array resolution at least matching that of the spatial light modulators 36, 38, 40, 42, 44 and 46. Alternatively, the accumulator 16 may be separate from the detector array 17. As will be described in greater detail below, the accumulator 16 accumulates light beam data that can then be shifted by means of a clock signal supplied by a clock generator 83 to the data output register 18 via the output interface bus 88. The accumulator 16 also includes circular shift bus 86 and lateral shift bus 84 to permit a wide variety of storage, shift and subtraction operations to be performed within the accumulator 16 during the operation of the optical data processor 20.

The data output register 18 is preferably a high speed analog-to-digital converter, shift register and buffer that channels the shifted output data from the accumulator 16 to the processor via the data bus 89. Initializing data from the controller 12 may be stored in the accumulator 16 via data line 87 and digital-to-analog converter 85.

As should be well apparent from the foregoing, the microcontroller 12 possesses full control over the optical data processor 20. Any desired data can be provided to any specific combination of spatial light modulators to implement a desired data processing algorithm. Of particular facility is that only those spatial light modulators required for the performance of any particular optical data processing algorithm need be actively utilized in the optical data processor 20 in accordance with the present invention. Spatial light modulators within the optical data processor 20 may be provided with appropriate data via their respective data registers to uniformly maintain the spatial light modulators at their maximum transmissivity. Consequently, selected spatial light modulators may be effectively removed from the optical data processor by their appropriate data programming. Thus, the optical data processing system 10 provides an extremely flexible environment for the performance of optical data processing computations.

Figure 2:
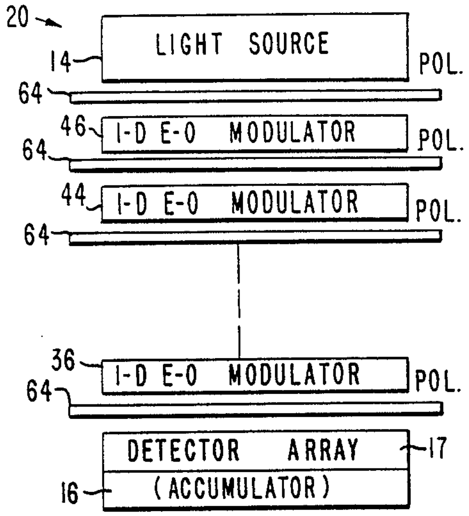
FIG. 2 is a side view of an optical data processor constructed in accordance with the present invention.

The structure of an optical data processor 20 fabricated in accordance with the preferred optical processor embodiment of the present invention is shown in FIG. 2. The embodiment shown is exemplary as including substantially all of the principle components that may be incorporated into any preferred embodiment of the optical processor.

The components of the optical data processor include the light source 14, SLM stages 36 through 46 and detector array 16. The flat panel light source 14 is preferably an electroluminescent display panel, or alternately, a gas plasma display panel or LED or LED array or laser diode or laser diode array. A diffuser (not shown) may be utilized to grade the light produced by the flat display panel into a spatially uniform optical beam.

The bulk of the optical data processor 20 is formed by a serial stack of SLM stages, of which SLM stage 46 is representative. Preferably, the SLM is a rigid structure required no additional support. In such embodiments, the SLMs may be placed immediately adjacent one another, separated only by a thin insulating optically transparent layer, yielding an optimally compact multistage stack of spatial light modulators. In embodiments where the operation of the spatial light modulator is accomplished through the polarization modulation of the light beam, polarizers 64 are preferably interposed between the SLMs. The polarizer 64 further permits the utilization of an unpolarized optical data beam source 14 in local polarization vector data representation embodiments of the present invention. If the principle of operation of the spatial light modulators is light absorption (instead of polarization rotation), then there is no need for the polarizers.

The accumulator 16 is preferably included as part of a solid state matrix array of optical detectors 17. In particular, the optical detector array 17 is preferably a shift register array of conventional charge couple devices (CCDs) provided at an array density equivalent to the effective resolution of the optical data processor 20. The use of a CCD array is preferred both for its charge accumulation, i.e. data summing, capability as well as for the ease of fabricating CCD shift register circuitry that can be directly controlled by the microcontroller 12. Further the use of the CCD array permits substantial flexiblity in the operation of the accumulator 16 by permitting data shifted out of the accumulator 16 and onto the data return bus 88 to be cycled back into the accumulator 16 via the circular shift data bus 86. Additionally, the accumulator 16 possesses the desirable flexibility through the use of adjacent register propagation path interconnections to permit lateral cycling of the data contained therein via the lateral shift data bus 84 as indicated in FIG. 1. Consequently, the accumulator 16 can be effectively utilized in the execution of quite complex optical data processing algorithms involving shift and sum operations under the direct control of the microcontroller 12.

Figure 3:
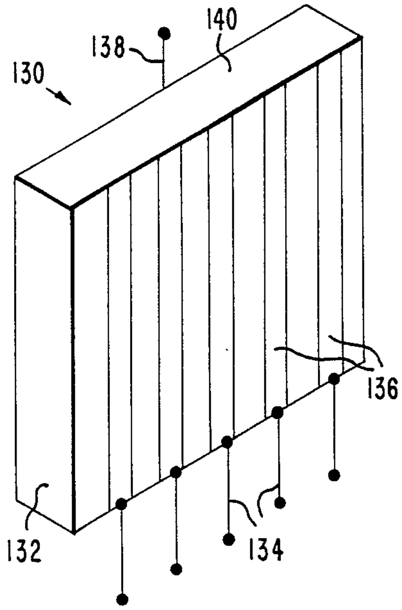
FIG. 3 is a perspective view of an electro-optical spatial light modulator for use in the present invention.
Figure 4:
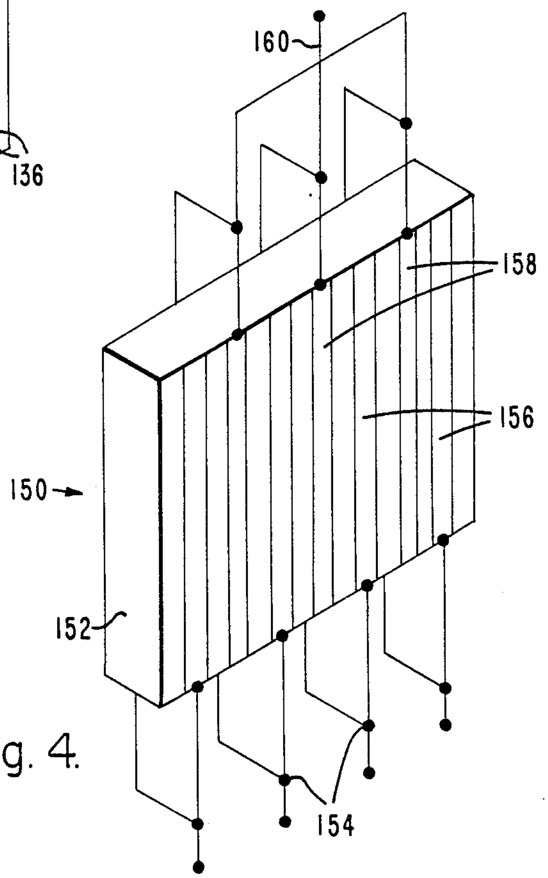
FIG. 4 is a perspective view of another electro-optical spatial light modulator for use in the present invention.

Two preferred embodiments of one-dimensional spatial light modulators are shown in FIGS. 3 and 4, respectively. The spatial light modulator 130 shown in FIG. 3 includes an electro-optic element 132 preferably having two major parallel opposing surfaces upon which stripe electrodes 136 and potential reference plane 140 are provided, respectively. The electro-optic element 132 may be a transmission mode liquid crystal light valve though preferably it is a solid state electro-optic material, such as $KD_2P0_4$ or $BaTi0_3$. This latter material polarization modulates light locally in proportion to the longitudinal and transverse voltage potential applied across the portion of the material that the light passes through. This material characteristically possesses sufficient structural strength to be adequately self-supporting for purposes of the present invention when utilized as electro-optic elements 132 and may be provided at a thickness approximately 5 to 10 mils for a major suface area of approximately one square inch.

As the active regions of the electro-optical element 132 necessarily lay between each of the stripe electrodes 136 and the reference plane elelctrode 140, the electrodes 136, 140 are preferably of a high conductivity transparent material such as indium tin oxide. Contact to the electrodes 136, 140 is preferably accomplished through the use of separate electrode leads 134, 138, respectively, that are attached using conventional wire bonding or solder bump interconnect technology.

FIG. 4 illustrates an alternate one-dimensional spatial light modulator. This spatial light modulator differs from that of FIG. 3 by the relative placement of the signal 156 and potential reference 158 electrodes on the two major surfaces of the electro-optic element 152. On each major surface, a reference potential electrode 158 is interposed between pairs of the signal electrodes 156 to form an interdigitated electrode structure that is essentially identical on both major surfaces of the electro-optic element 152. The active portions of the electro-optic element 152 lie between each of the signal electrodes 156 and their surface neighboring refernce potential electrodes 158.

Thus, the achievable electro-optic effect is enhanced through the utilization of both surfaces of the electro-optic element 152. Further, as the active portions of the electro-optic element 152 are not shadowed by the signal electrodes 156, all of the electrodes 156, 158 may be of an opaque conductive material, such as aluminum, that may be further advantageously utilized to effectively mask the active regions of the electro-optic element 152. That is, the electrodes 156, 158 may be utilized to block the respective pixel edge portions of the data beam as they diverge while passing through the electro-optic element 152.

Similar to the spatial light modulators 13 of FIG. 3, the electro-optic element 152 may be either a liquid crystal light valve or a solid state electro-optic material. For reasons of faster electro-optic response, time, greater structural strength, and ease of fabrication, transverse field polarization modulator electro-optic materials, such as represented by $LiNbO_3$, $LiTaO_3$, $BaTiO_3$, $Sr_xBa_{(1-x)}NdO_3$ and PLZT are preferred.

The operation of an optical data processing system of the type described above is best understood by analyzing its operation in performing matrix multiplication. R. A. Athale and W. C. Collins, in their paper "Optical Matrix-matrix Multiplier Based on Outer Product Decomposition," Applied Optics 21, 2089 (1982), have described the principle of outer product decomposition for optical matrix multiplication.

Thus the product matrix C of two matrices B and A is given by $$C=BA \qquad (3)$$

where the ij-th element of C is given by the inner product between the i-th row vector of B and the j-th column vector of A:

$$C_{ij} = \sum_m b_{im}a_{mj} \qquad (4)$$

However, C can also be written as a sum of matrices, each of which is the outer product between a column vector of B and the corresponding row vector of A. The principle behind an outer product matrix multiplier is to sequentially provide the rows of matrix B into an SLM such as SLM 38 and the corresponding columns of matrix A into another SLM such as SLM 36 which is orthogonal to the first SLM. The transmission of the two crossed SLMs during the nth clock cycle of clock generator 83 is given by the outer product of the nth row of B and the nth column of A. The transmitted light falls on accumulator detector array 16 and is summed to form the product matrix C. The multiplication of two N×N matrices, which requires $N^3$ multiplications, is performed in N clock cycles.

Figure 5:
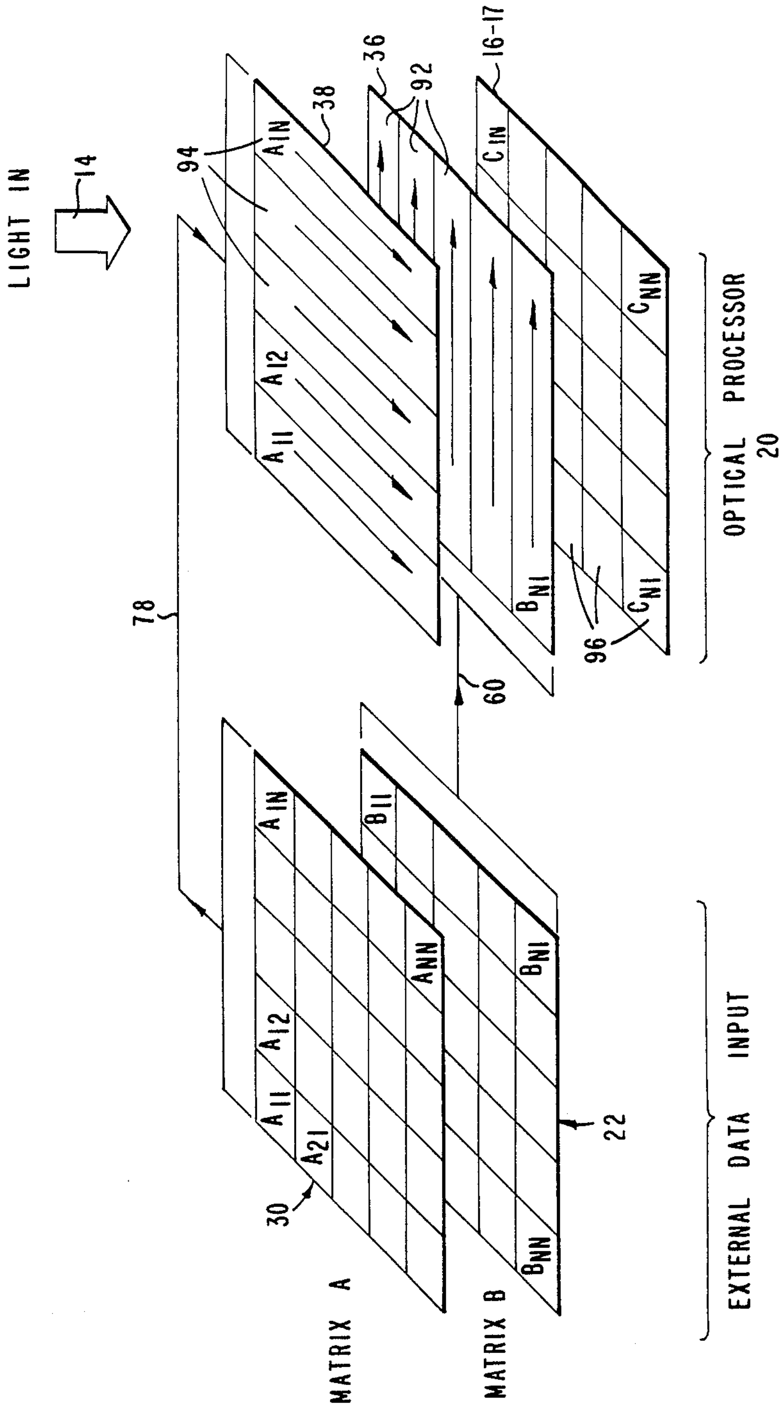
Fig. 5. (PRIOR ART)
FIG. 5 is an exploded perspective schematic representation of a prior art optical data processing system for processing matrices.

FIG. 5 shows the elements of the two matrices A and B as they are provided by storage registers 30 and 22 to SLMs 38 and 36, one row and column at a time, respectively. (Polarizers which are located between the SLMs have been omitted from FIG. 5 for the sake of clarity.) The electrodes on each SLM 36, 38 divide the SLM into strip shaped regions 92, 94, hereinafter referred to as unit cells. Each cell is used to process a matrix element. During the nth clock cycle, light from source 14 is modulated in one direction by the nth row of A and in the orthogonal direction by the nth column of B, forming the nth outer product matrix at the accumulator detector array 16, 17, the sum of which is the product matrix C. Note that only two SLMs are required for the matrix multiplication operation. The array 16, 17 is divided into cells 96, where each cell corresponds to one of the elements $c_{ij}$.

While the above description prior art optical processor works well for performing matrix multiplication, it is not designed to perform matrix inversion or addition.

Figure 6:
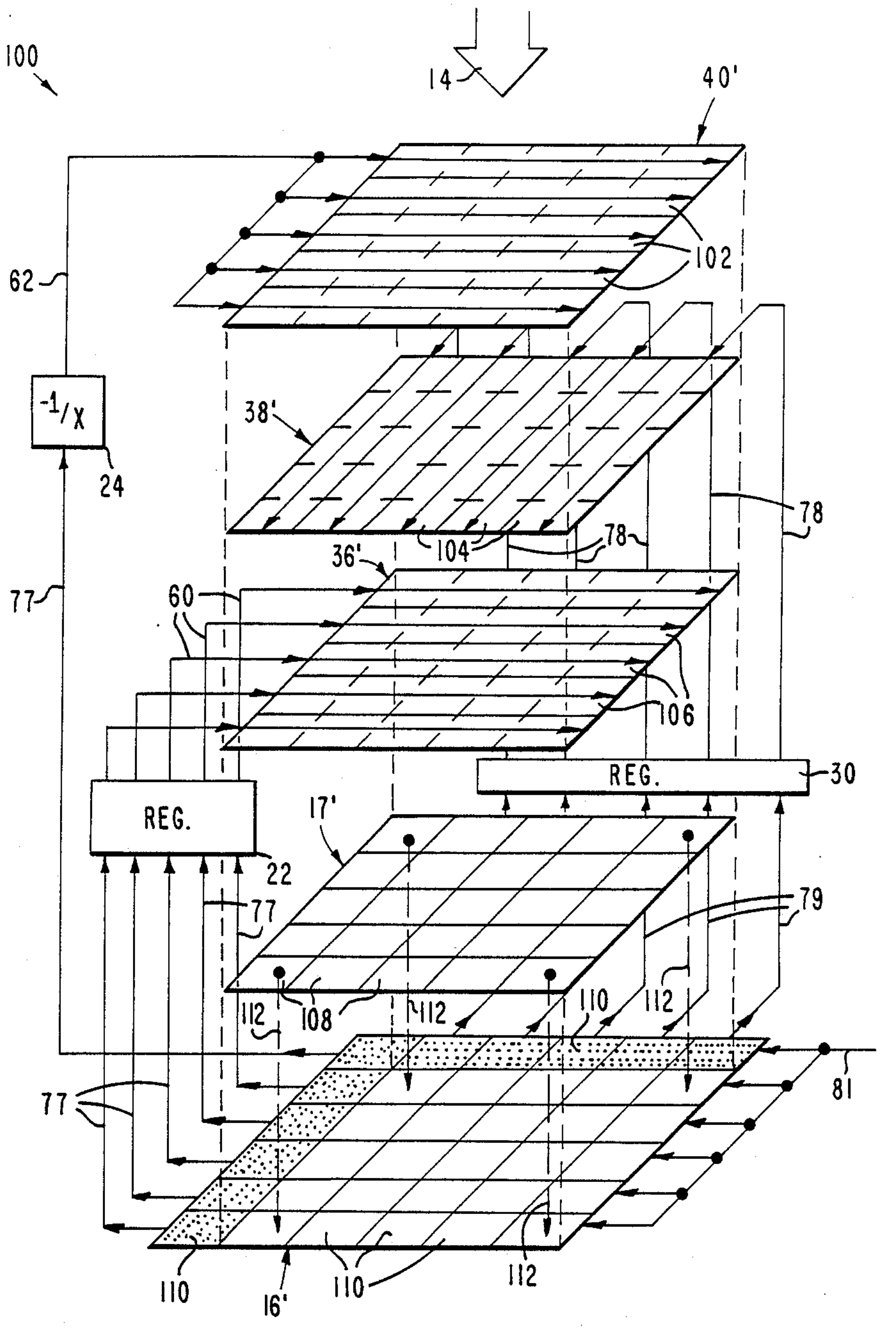
FIG. 6 is an exploded perspective schematic view of an optical processor constructed in accordance with the invention for processing four matrices A, B, C, and D to compute the expression $CA^{-1}B+D$.

FIG. 6 shows an embodiment 100 of the invention which is an optical processor for processing four N×N matrices A, B, C and D to calculate the expression $CA^{-1}B+D$. For purposes of example, N is shown equal to 3 in FIG. 6. It will become apparent to those skilled in the art from the following description that N may be set to any practical value in the present invention.

Before describing the specific embodiment 100, a discussion of the mathematical expressions employed in the operation of the invention will be provided.

The invention makes use of the Faddeev algorithm, as disclosed in the text "Computational Methods of Linear Algebra," V. N. Faddeeva, Dover Publications, 1959, pp. 90–93.

Briefly, the algorithm provides a means of calculating the expression $CA^{-1}B+D$ where A, B, C and D are N×N matrices. These four matrices are placed in a four quadrant field (which forms a 2N×2N matrix) as follows:

$$\begin{array}{r|l} A & B \\ \hline -C & D \end{array} \qquad (5)$$

A new four quadrant field is constructed by multiplying matrix A by a matrix W, and adding the result to the third quadrant field −C. The matrix B is also multiplied by the matrix W, and the result added to the fourth quadrant field D. The new four quadrant field is as follows:

$$\begin{array}{r|l} A & B \\ \hline WA-C & WB+D \end{array} \qquad (6)$$

Using Gaussian elimination, a mathematical procedure well known to those skilled in the art, the matrix W is found, such that $$WA-C=O \qquad (7)$$

or, equivalently:

$$W=CA^{-1} \qquad (8)$$

Substituting this value of W into the field (6) yields the following matrix:

$$\begin{array}{r|l} A & B \\ \hline O & CA^{-1}B+D \end{array} \qquad (9)$$

The expression in the fourth quadrant is the desired expression, which includes matrix multiplication, inversion and addition. For example, by setting A equal to the identity matrix, matrix (A=1), one obtains matrix multiplication and addition:

$$CB+D \qquad (10)$$

By setting matrix C=1 and matrix D=0, one obtains matrix inversion and multiplication:

$$A^{-1}B \tag{11}$$

By setting matrix A=1 and matrix D=0, one obtains matrix multiplication:

$$CB \tag{12}$$

By setting B=1, 1 C=1, and D=0, one obtains matrix inversion:

$$A^{-1} \tag{13}$$

By treating the four quadrant field (5) as one matrix of order 2N, the terms of a new matrix may be calculated, using Gaussian elimination, by applying the formula:

$$X_{nm}^{new} = X_{nm}^{old} - \frac{X_{nl}^{old} \cdot X_{lm}^{old}}{X_{ll}^{old}} \tag{14}$$

where $X_{nm}^{new}$ is the desired term of the new matrix, and $X_{nm}^{old}$ is the corresponding term of the original matrix (5).

It may be shown that by applying the formula (14), all of the terms in the top row and left column of the new matrix becomes zero, whereby the new matrix is reduced to order 2N−1. If the procedure in formula (14) is repeated for a total of N times, a matrix of order N given by the expression $CA^{-1}B+D$ is the result.

If, during the above described procedure, an upper left corner term ($X_{11}^{old}$) is zero, a well known procedure known as "partial pivoting" is performed, whereby the first matrix row is exchanged with any other non-zero first term row. At the same time, these two rows are exchanged in the new matrix.

Returning to FIG. 6, the optical processor 100 processes four N×N (N=3) matrices A, B, C, and D to arrive at the expression $CA^{-1}B+D$ using the principles set forth above. The processor 100 includes first, second and third SLMs 40', 38', and 36', respectively, and a light source 14 arranged in a manner similar to that previously described. The SLM 40' is divided into 2N−1 rows of stripe shaped unit cells 102, the SLM 38' is divided into 2N−1 columns of striped shaped unit cells 104 (orthogonal to the cells 102), and the SLM 36' is divided into 2N-1 rows of striped shaped unit cells 106 (orthogonal to the cells 104).

A light detector 17' is provided, which is divided into $(2N-1)^2$ light detection areas 108 arranged as a matrix array of 2N−1 rows and 2N−1 columns. The detection areas 108 provide detector signals in response to light modulated by respective modulation areas of the modulators 40', 38', 36'. The physical correspondence between the modulation areas 102, 104 and 106 and the detection areas 108 may be clearly seen in FIG. 6. The detector signals from the areas 108 are each provided (via, for example, lines 112) to a corresponding location 110 in accumulator 16'. The accumulator 16', which may be integrated with the detector 17' as a single device, contains a total of $(2N)^2$ locations 110 arranged as a matrix of 2N rows and 2N columns. The $(2N-1)^2$ unshaded locations 110 shown in FIG. 6 correspond to the respective $(2N-1)^2$ detector areas 108 of detector 17'. The shaded locations 110 represent an additional left column and top row of accumulator locations. The accumulator 16' is used for storing, adding and shifting the detector signals. These signals are proportional to the product of the signals modulating the corresponding areas of the SLMs 40', 38', and 36', as explained above.

The signal appearing at the left uppermost location 110 of the accumulator 16' is provided via bus 77 to register 24, where it is arithmetically inverted with a minus sign (−1/X) and then provided via bus 62 as the modulation signal to all 2N−1 modulation areas 102 of SLM 40'. The signals appearing at the remaining 2N−1 locations 110 in the left-most column of the array 16' are provided, through register 22 (for suitable signal conditioning) as modulation signals to corresponding rows of modulation areas 106 to SLM 36'.

The signals appearing at the 2N−1 left-most locations 110 along the top row of the array 16' are provided through register 30 (for suitable signal conditioning) to corresponding columns of modulation areas 104 of SLM 38'.

The operation of the processor 100 is as follows. Signals representing the elements of the four matrices A, B, C, D are provided, via bus 81, to the accumulator 16', where they are stored in the following manner. The matrix A is stored in the upper left quadrant; the matrix B in the upper right quadrant; the matrix C (with element polarity inverted) in the lower left quadrant; and the matrix D in the lower right quadrant of the accumulator 16'. The reader will note the analogy between the matrix storage locations and the four quadrant field (5).

After the matrices are loaded into the accumulator 16' the following steps take place. (a) The elements in the left-most column and top row are provided as modulation signals to the SLMs 40', 38' and 36' in the manner described above. (b) The resultant modulated light is detected in areas 108 of detector 17'. The detector signals from areas 108 are provided to the unshaded locations 110 of accumulator 16', where they are added to the corresponding element signals previously stored therein. The result of the addition then becomes the signal stored in these locations 110.

(c) The contents of the accumulator array 16' are then shifted one column to the left and one row to the top.

The operations described in sections (a) through (c) above are repeated N−1 times, whereby the expression $CA^{-1}B+D$ is provided in the upper left quadrant of the array 16'.

In the event a "zero" signal appears at the upper left most location 110 of the array 16', a partial pivoting procedure (not shown) is implemented to perform the operations described above. Such a procedure may be easily implemented in the processor 12 of FIG. 1.

As described above, by proper choice of the matrices A, B, C, D the processor 100 can be made to perform a wide variety of mathematical computations without the need for changes in system configuration. If, however, it is only desired to perform matrix inversion, the processor 100 may be simplified. Such a simplification appears in FIG. 7.

Figure 7:
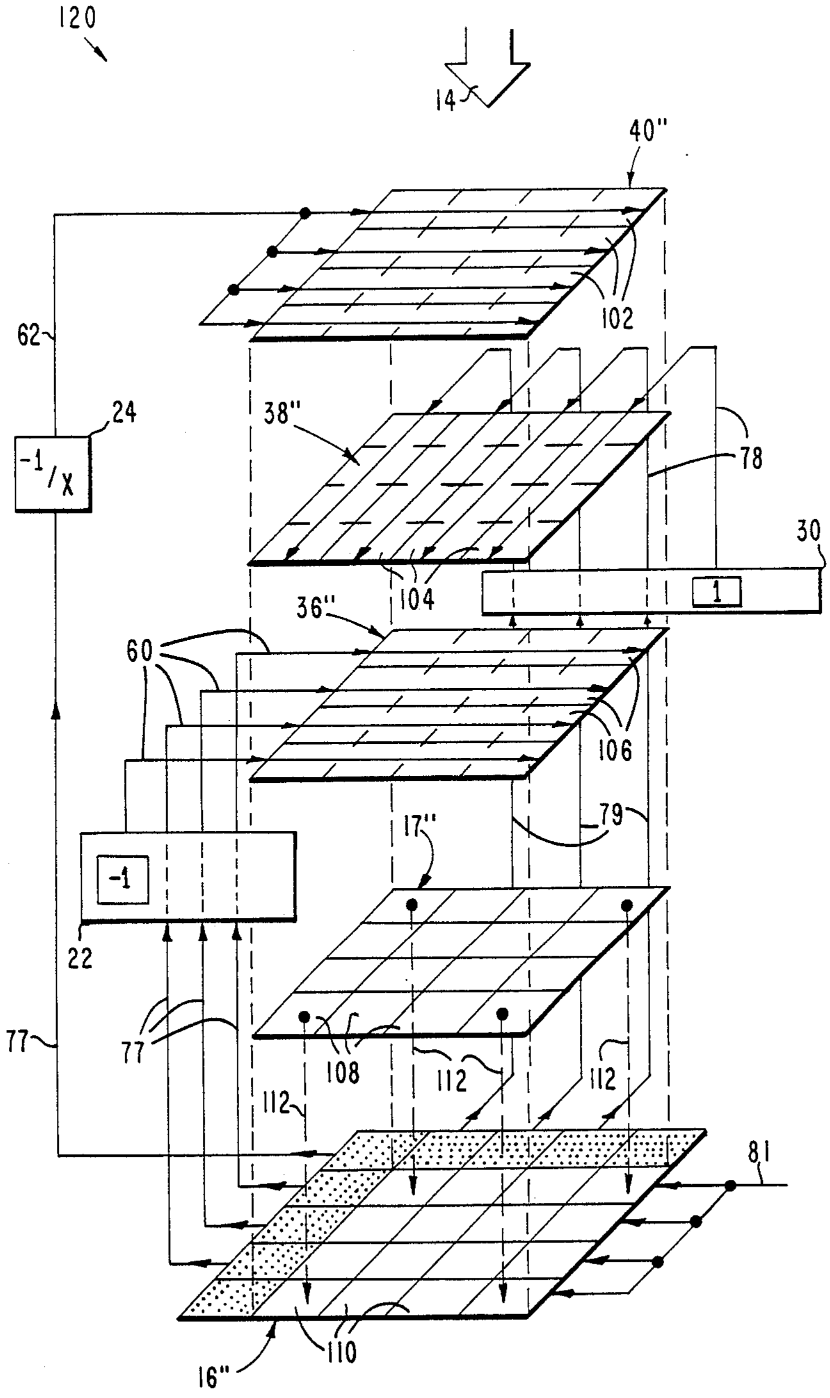
FIG. 7 is an exploded perspective schematic view of an optical processor constructed in accordance with the invention for processing a matrix A to compute the inverse matrix $A^{-1}$.

FIG. 7 shows an embodiment 120 of the invention which is an optical processor for calculating the inverse of an N×N matrix (where N=4 for purpose of example), and is a simplification of the processor 100 just described.

The processor 120 is similar in construction to the processor 100, with the following differences. First, second and third SLMs 40", 38" and 36", respectively, are each divided into N unit cells, 102, 104, 106, respectively, where the cells are oriented in the same manner as their counterparts in the processor 100. In similar fashion, detector 17" is divided into $N^2$ detector areas 108 arranged as an N×N matrix. Accumulator 16" contains $(N+1)^2$ locations arranged as N+1 rows and N+1 columns. $N^2$ locations 110 (shown unshaded) of the accumulator 16″ correspond to the $N^2$ detection areas 108 and receive detector signals therefrom.

The signal appearing at the left uppermost location 110 of the accumulator 16″ is provided via bus 77 to register 24 where it is arithmetically inverted with a minus sign and then provided via bus 62 as the modulation signal to all N modulation areas 102 of SLM 40″. The N−1 signals appearing at the left column of the array 16″ between the top and bottom rows are applied through register 22 (for suitable signal conditioning) to the N−1 modulation areas 106 in the top row of SLM 36″. The register 22 provides a signal representing the number −1 to the area 106 at the bottom row of the SLM 36″.

The signals appearing at the N−1 top row locations 110 of the array 16″ between the left and right-most columns are provided through register 30 (for suitable signal conditioning) to the N−1 left-most columns 104 of the SLM 38″. The register 30 provides a signal representing the number 1 to the right-most column 104 of the SLM 38″.

The operation of the processor 120 is as follows. Signals representing the elements of a matrix A are provided, via bus 81, to the accumulator 16″ where they are stored in the unshaded locations 110, while maintaining the spatial relationship between elements.

After the matrix A is loaded into the accumulator 16″, the following steps take place. (a) The data in the accumulator locations 110 are shifted one column to the left and one row to the top, and signals representing zero are stored in the bottom row and right column locations 110 of the array 16″. (b) The elements in the left-most column and top row are provided as modulation signals to SLMs 40″, 38″ and 36″ in the manner described above. (c) The resultant modulated light is detected in areas 108 of detector 17″. The detector signals from areas 108 are provided to the unshaded locations 100 of accumulator 16″, where they are added to the corresponding element signals previously stored therein. The result of the addition then becomes the new stored signal.

The operations described in sections (a) through (c) above are repeated N−1 times, whereby the inverted matrix $A^{-1}$ is provided in the unshaded locations 110 of the accumulator 16″.

As in the previous embodiment 110, a partial pivoting procedure is provided in the event a zero signal appears at the upper left-most location 110 of the array 16″.

While there have been shown and described preferred embodiments of the invention, it is to be understood that various other adaptations and modifications may be made which are within the spirit and scope of the invention. It is thus intended that the invention be limited in scope only by the appended claims.

What is claimed is:

1. Apparatus for optically processing for N×N matrices A, B, C, and D to calculate the expression $CA^{-1}B+D$, comprising:

first modulator means for spatially modulating an optical beam in response to a signal representing a first number, and having a first set of modulation areas arranged as 2N−1 rows;

second modulator means for spatially modulating the optical beam exiting the first modulator means in response to signals representing elements in a second row of 2N−1 numbers, and having a second set of modulation areas arranged as 2N−1 columns;

third modulator means for spatially modulating the optical beam exiting the second modulator means in response to signals representing elements in a third column of 2N−1 numbers, and having a third set of modulation areas arranged as 2N−1 rows;

light detector means having $(2N-1)^2$ light detection areas arranged as a matrix array of 2N−1 rows and 2N−1 columns, where the detection areas provide an array of detector signals in response to light modulated by respective modulation areas of the first, second and third modulator means, each element in the array of detector signals being proportional, respectively, to the product of the first number, a respective element in the second row of numbers, and a respective element in the third column of numbers;

accumulator means for storing, adding and shifting the array of detector signals, and having $(2N)^2$ locations arranged as an accumulator matrix array of 2N rows and 2N columns;

means for storing the elements of the matrix A in the upper left quadrant of the accumulator array, for storing the elements of the matrix B in the upper right quadrant of the accumulator array, for storing the elements of the matrix D in the lower right quadrant of the accumulator array, and for storing the polarity inverted elements of the matrix C in the lower left quadrant of the accumulator array; and controls means for:

(a) providing the negative reciprocal of the upper left-most location of the accumulator array as the first number to the first modulator means;

(b) providing the 2N-1 right-most elements of the top row of the accumulator array as the second row of numbers to the second modulator means;

(c) providing the 2N−1 bottom-most elements of the left column of the accumulator array as the third column of numbers to the third modulator means;

(d) adding the elements of the array of detector signals to corresponding elements in the portion of the accumulator array comprising the 2N−1 right-most columns and the 2N−1 bottom-most rows;

(e) shifting the contents of the accumulator array one column to the left and one row to the top; and (f) repeating the operations in (a) through (e) N−1 times, whereby the expression $CA^{-1}B+D$ is provided in the upper left quadrant of the accumulator array.

2. Apparatus for optically processing an N×N matrix A to calculate the inverse matrix $A^{-1}$, comprising:

first modulator means for spatially modulating an optical beam in response to a signal representing a first number, and having a first set of modulation areas arranged as N rows;

second modulator means for spatially modulating the optical beam exiting the first modulator means, and having a second set of modulation areas arranged as N columns, where the right-most column modulates light in response to a constant signal representing the number 1, and the remaining N−1 columns modulate light in response to signals representing elements in a second row of N−1 numbers;

third modulator means for spatially modulating the optical beam exiting the second modulator means and having a third set of modulation areas arranged as N rows, where the bottom row modulates light in response to a constant signal repesenting the number $-1$, and the remaining $N-1$ rows modulate light in repsonse to signals representing elements in a third column of $N-1$ numbers;

light detector means having $N^2$ light detection areas arranged as a matrix array of N rows and N columns, where the detection areas provide an array of detector signals in response to light modulated by respective modulation areas of the first, second and third modulator means, each element in the array of detector signals being proportional, respectively, to the product of the first number, the number 1 or a respective element in the second row of numbers, and the number $-1$ or a respective element in the third column of numbers;

accumulator means for storing, adding and shifting the array of detector signals, and having $(N+1)^2$ locations arranged as an accumulator matrix array of $N+1$ rows and $N+1$ columns;

means for storing the elements of the matrix A in the N right-most columns and the N bottom-most rows of the accumulator array; and control means for:

(a) shifting the contents of the accumulator array one column to the left and one row to the top and providing zeros in the N bottom locations of the right-most column and the N right locations of the bottom row of the accumulator array;

(b) providing the negative reciprocal of the upper left-most location of the accumulator array as the first number to the first modulator means;

(c) providing the $N-1$ elements in the top row of the accumulator array between the left and right-most elements of that row as the second row of numbers to the second modulator means;

(d) providing the $N-1$ elements in the left column of the accumulator array between the top and bottom-most elements of that column as the third column of numbers to the third modulator means;

(e) adding the elements of the array of detector signals to corresponding elements in the portion of the accumulator array comprising the N right-most columns and the N bottom-most rows; and (f) repeating the operations in (a) through (e) $N-1$ times, whereby the matrix $A^{-1}$ is provided in the portion of the accumulator array comprising the N right-most columns and the N bottom-most rows.

3. A method of optically processing four $N \times N$ matrices A, B, C and D to calculate the expression $CA^{-1}B+D$, said method comprising the steps of:

(a) storing signals corresponding to the elements of the matrix A in the upper left quadrant of an accumulator array;

(b) storing signals corresponding to the elements of the matrix B in the upper right quadrant of the accumulator array;

(c) storing signals corresponding to the elements of the matrix D in the lower right quadrant of the accumulator array;

(d) storing signals corresponding to the polarity inverted elements of the matrix C in the lower left quadrant of the accumulator array;

(e) coupling the negative reciprocal of the signal located in the upper left-most location of the accumulator array to a first modulator having a first set of modulation areas arranged as $2N-1$ rows to provide a first number thereto;

(f) coupling the 2N—1 right-most signals corresponding to elements of the top row of the accumulator array to a second modulator having a second set of modulation areas arranged as $2N-1$ columns to provide a row of numbers thereto;

(g) coupling 2N—1 bottom-most signals corresponding to elements of the left column of the accumulator array to a third modulator having a third set of modulation areas arranged as $2N-1$ rows to provide a column of numbers thereto;

(h) modulating an optical beam in response to the signal corresponding to the first number by means of the first modulator;

(i) modulating the optical beam exiting the first modulator in response to signals corresponding to elements in the row of numbers by means of the second modulator;

(j) modulating the optical beam exiting the second modulator in response to signals corresponding to elements in the column of numbers by means of the third modulator;

(k) processing the modulated optical beam by means of a light detector having $(2N-1)^2$ light detection areas arranged as a matrix array of $2N-1$ rows and $2N-1$ columns, where the detection areas provide an array of detector signals in response to light modulated by respective modulation areas of the first, second and third modulators, each element in the array of detector signals being proportional, respectively, to the product of the first number, a respective element in the row of numbers, and a respective element in the column of numbers;

(l) adding the array of detector signals to corresponding signals stored in the $2N-1$ rightmost columns and the 2N—1 bottom-most rows of the accumulator array; and (m) shifting the contents of the accumulator array one column to the left and one row to the top;

(n) repeating the operations in steps (e) through (m) $N-1$ times, whereby the expression $CA^{-1}B+D$ is provided in the upper left quadrant of the accumulator array.

4. A method of optically processing an $N \times N$ matrix A to calculate the inverse matrix $A^{-1}$, said method comprising the steps of:

(a) storing signals corresponding to the elements of the matrix A in the N right-most columns and the N bottommost rows of an accumulator array having $(N+1)^2$ locations arranged as an accumulator matrix array of $N+1$ rows and $N+1$ columns;

(b) shifting the contents of the accumulator array one column to the left and one row to the top and storing zeroes in the N bottom locations of the right-most column and the N right-most locations of the bottom row of the accumulator array;

(c) coupling the negative reciprocal of the signal located in the upper left-most location of the accumulator array to a first modulator having a first set of modulation areas arranged as N rows to provide a first number thereto;

(d) coupling signals corresponding to the $N-1$ elements in the top row of the accumulator array excluding the right-most element of that row to a corresponding row of elements of a second modulator having a second set of modulation areas arranged as N columns, and coupling a constant signal corresponding to the number 1 to the right-most element of the row to provide a row of numbers thereto;

(e) coupling signals corresponding to the N−1 elements of the left column of the accumulator array excluding the bottom-most element of that column to a corresponding column of elements of a third modulator having a third set of modulation areas arranged as N rows, and coupling a constant signal corresponding to the number −1 to the bottom-most element of the column to provide a column of numbers thereto;

(f) modulating an optical beam in response to the signal representing the first number by means of the first modulator;

(g) modulating the optical beam exiting the first modulator by means of the second modulator in response to the constant signal corresponding to the number 1 and the signals corresponding to the row of numbers;

(h) modulating the optical beam exiting the second modulator by means of the third modulator in response to the constant signal corresponding to the number −1 and the signals corresponding to the column of numbers;

(i) processing the spatially modulated optical beam by means of a light detector having $N^2$ light detection areas arranged as a matrix array of N rows and N columns, where the detection areas provide an array of detector signals in response to light modulated by respective modulation areas of the first, second and third modulators, each signal in the array of detector signals being proportional, respectively, to the product of the first number, the number 1 or a respective element in the row of numbers, and the number −1 or a respective element in the column of numbers;

(j) adding the array of detector signals to corresponding signals in the N right-most columns and the N bottom-most rows of the accumulator array; and (k) repeating the operations in steps (b) through (j) N−1 times, whereby the matrix $A^{-1}$ is provided in the portion of the accumulator array comprising the N right-most columns and the N bottom-most rows.

5. A method of optically processing four N×N matrices A, B, C and D to calculate the expression $CA^{-1}B+D$, said method comprising the steps of:

(a) storing signals corresponding to the elements of the matrix A in the upper left quadrant of an accumulator array;

(b) storing signals corresponding to the elements of the matrix B in the upper right quadrant of the accumulator array;

(c) storing signals corresponding to the elements of the matrix D in the lower right quadrant of the accumulator array;

(d) storing signals corresponding to the polarity inverted elements of the matrix C in the lower left quadrant of the accumulator array;

(e) modulating an optical beam in response to the negative reciprocal of the signal located in the upper leftmost location of the array by means of a first modulator having a first set of modulation areas arranged as 2N−1 rows;

(f) modulating the optical beam exiting the first modulator in response to the 2N—1 right-most signals corresponding to elements of the top row of the array by means of a second modulator having a second set of modulation areas arranged as 2N−1 columns;

(g) modulating the optical beam exiting the second modulator in response to signals corresponding to the 2N—1 bottom-most signals corresponding to elements of the left column of the array by means of a third modulator having a third set of modulation areas arranged as 2N−1 rows;

(h) processing the modulated optical beam by means of a light detector having $(2N-1)^2$ light detection areas arranged as a matrix array of 2N−1 rows and 2N−1 columns;

(i) adding the array of detector signals to corresponding signals stored in the 2N—1 right-most columns and the 2N—1 bottom-most rows of the accumulator array; and (j) shifting the contents of the accumulator array one column to the left and one row to the top;

(k) repeating the operations in steps (e) through (j) N−1 times, whereby the expression $CA^{-1}B+D$ is provided in the upper left quadrant of the accumulator array.

6. A method of optically processing an N×N matrix A to calculate the inverse matrix $A^{-1}$, said method comprising the steps of:

(a) storing signals corresponding to the elements of the matrix A in N right-most columns and the N bottom-most rows of an accumulator array having $(N+1)^2$ locations arranged as a matrix array of N+1 rows and N+1 columns;

(b) shifting the contents of the accumulator array one column to the left and one row to the top and storing zeroes in the N bottom locations of the right-most column and the N right-most locations of the bottom row of the acculator array;

(c) coupling the negative reciprocal of the signal located in the upper left-most location of the accumulator array to a first modulator having a first set of modulation areas arranged as N rows to provide a first number thereto;

(d) coupling signals corresponding to the N−1 elements in the top row of the accumulator array excluding the right-most element of that row to a corresponding row of elements of a second modulator having a second set of modulation areas arranged as N columns, and coupling a constant signal corresponding to the number 1 to the right-most element of the row to provide a row of numbers thereto;

(e) coupling signals corresponding to the N−1 elements of the left column of the accumulator array excluding the bottom-most element of that column to a corresponding column of elements of a third modulator having a third set of modulation areas arranged as N rows, and coupling a constant signal corresponding to the number −1 to the bottom-most element of the column to provide a column of numbers thereto;

(f) modulating an optical beam in response to the signal corresponding to the first number by means of the first modulator;

(g) modulating the optical beam exiting the first modulator by means of the second modulator in response to the row of numbers;

(h) modulating the optical beam exiting the second modulator by means of the third modulator in response to the column of numbers;

(i) processing the spatially modulated optical beam by means of a light detector having $N^2$ light detection areas arranged as a matrix array of N rows and N columns;

(j) adding the array of detector signals to corresponding signals in the N right-most columns and the N bottom-most rows of the array; and (k) repeating the operations in steps (b) through (j) $N-1$ times, whereby the matrix $A^{-1}$ is provided in the portion of the array comprising the N right-most columns and the N bottom-most rows.

7. A method of optically processing four N×N matrices A, B, C and D to calculate the expression $CA^{-1}B+D$, said method comprising the steps of:

(a) storing signals corresponding to the elements of the matrix A in the upper left quadrant of an array of $2N^2$ light detectors/accumulators arranged as a matrix of 2N rows and 2N columns;

(b) storing signals representing the elements of the matrix B in the upper right quadrant of the array;

(c) storing signals representing the elements of the matrix D in the lower right quadrant of the array;

(d) storing signals representing the polarity inverted elements of the matrix C in the lower left quadrant of the array;

(e) uniformly modulating an optical beam in response to the negative reciprocal of a signal located in the upper left corner of the array by means of a first modulator having a first set of modulation areas arranged as $2N-1$ rows;

(f) spatially modulating the optical beam exiting the first modulator in response to signals representing elements in a predetermined row of numbers by means of a second modulator having a second set of modulation areas arranged as $2N-1$ columns;

(g) spatially modulating the optical beam exiting the second modulator in response to signals representing elements in a predetermined column of numbers by means of a third modulator having a third set of modulation areas arranged as $2N-1$ rows;

(h) integrating the modulated optical beam in the array;

(i) shifting the contents of the array one column to the left and one row to the top; and (j) repeating the operations in (e) through (i) $N-1$ times, to compute the expression $CA^{-1}B+D$, which expression is provided in the upper left quadrant of the array.

8. A method of optically processing four N×N matrices A, B, C and D to calculate the expression $CA^{-1}B+D$, said method comprising the steps of:

(a) storing signals corresponding to the elements of the matrices A, B, C and D in four quadrants of an array having $2N^2$ detection areas arranged as a matrix array of 2N rows and 2N columns;

(b) uniformly modulating a two dimensional optical beam in response to the negative reciprocal of the signal located in the upper left-most location of the array;

(c) spatially modulating the optical beam along the direction of the rows of the matrix in response to signals representing the signals stored in the top row of the array;

(d) spatially modulating the optical beam along the direction of the columns in response to signals representing the signals stored in the left column of the array;

(e) adding the signals modulated in steps (c), (d) and (e) to the contents of the elements of the array;

(f) shifting the stored contents stored in the array one column to the left and one row to the top; and (g) repeating the operations in steps (b) through (f) $N-1$ times, to compute the expression $CA^{-1}B+D$, which expression is provided in the upper left quadrant of the array.

9. A method of optically processing an N×N matrix A to calculate the inverse matrix $A^{-1}$, said method comprising the steps of:

(a) storing signals corresponding to the elements of the matrix A in one quadrant of a subarray of $(2N-1)^2$ detection areas which are a portion of an array of $2N^2$ areas arranged in rows and columns;

(b) shifting the stored contents of the quadrant of the array by one column and one row in a direction toward a predetermined corner location of the array and storing zeroes in the previously occupied areas of the subarray;

(c) uniformly modulating an optical beam along the direction of the rows of the matrix in response to the negative reciprocal of the signal located in the predetermined corner location of the array;

(d) uniformly modulating the optical beam along a predetermined column of the matrix in response to a constant signal corresponding to the number 1;

(e) spatially modulating the optical beam along the balance of the columns of the matrix in response to signals corresponding to the balance of the shifted signals stored in the top row of the array;

(f) uniformly modulating the optical beam along a predetermined row of the matrix in response to a constant signal corresponding to the number $-1$;

(g) spatially modulating the optical beam along the balance of the rows in response to signals corresponding to the balance of the signals stored in the left column of the array;

(h) detecting the modulated optical beam, converting the beam into corresponding stored electrical signals, and adding these electrical signals to the signals stored in the array; and (i) repeating the operations in steps (b) through (h) $N-1$ times to compute the matrix $A^{-1}$, which matrix is stored in the quadrant of the subarray proximate to the corner location of the array.

10. A method of processing four matrices of data A, B, C and D, each having order N, to compute the matrix $CA^{-1}B+D$, and thus provide for matrix multiplication, matrix inversion, matrix addition and combinations thereof by appropriate selection of the initial data comprising said matrices, said method comprising the steps of:

loading four matrices of data, which correspond to the matrices of the Faddeev algorithm, into predetermined elements of an array of $2N^2$ detectors/accumulators arranged as a matrix of rows and columns;

optically computing the outer product of rows and columns of selected matrices divided by the negative value of the data contained in a preselected element of the array and adding these values to the previously stored values in accordance with the relationship $$X_{new}^{nm}=X_{old}^{nm}-((X_{old}^{n1}\cdot X_{old}^{1m})/X_{old}^{11}),$$

and;

performing the optical computing operation on the data N−1 times, the resultant matrix produced thereby comprising the matrix $CA^{-1}B+D$, and wherein combinations of matrix multiplication, matrix inversion and matrix addition of the matrices A, B, C and D are achieved by appropriate selection of the data initially loaded into the matrices.

11. The method of claim 10 wherein said optical computing step comprises the steps of:

(a) uniformly modulating an optical beam in response to the reciprocal of the signal located in the upper leftmost location of the array;

(b) spatially modulating the optical beam along the direction of the rows of the matrix in response to signals stored in the top row of the array;

(c) spatially modulating the optical beam along the direction of the columns in response to signals stored in the left column of the array;

(d) integrating the modulated optical beam in the array; and (e) shifting the stored contents of the array one column to the left and one row to the top.

12. The method of claim 10 wherein said optical computing step comprises the steps of:

(a) uniformly modulating an optical beam in response to the negative reciprocal of the signal located in a predetermined corner location of the array;

(b) uniformly modulating the optical beam along a predetermined row of the matrix in response to a constant signal corresponding to the number −1;

(c) spatially modulating the optical beam along the balance of the rows of the matrix in response to signals corresponding to the balance of the signals stored in the top row of the array;

(d) uniformly modulating the optical beam along a predetermined column of the matrix in response to a constant signal corresponding to the number 1;

(e) spatially modulating the optical beam along the balance of the columns in response to signals corresponding to the balance of the signals stored in the left column of the array;

(f) integrating the modulated optical beam in the array; and (g) shifting the stored contents of the array one column to the left and one row to the top;

wherein the above optical computing steps provide the inverse of the matrix A loaded into said array.

13. A method of processing four matrices of data A, B, C and D, each having order N, to compute the matrix $CA^{-1}B+D$, and thus provide for matrix multiplication, matrix inversion, matrix addition and combinations thereof by appropriate selection of the initial data comprising said matrices, said method comprising the steps of:

providing a light source with emits light along an optical path;

disposing a plurality of light modulators, each having order 2N−1, sequentially along the optical path, each modulator being adapted to modulate light incident thereupon along one dimension thereof, alternate modulators having an orthogonal orientation with respect to a prior modulator in the sequence;

disposing a programmable array of 2N×2N detector/accumulator elements along the optical path which is adapted to store electrical signals indicative of initializing data which is to be processed, receive light that is modulated by the modulators, convert the received light into corresponding electrical signals and store the converted electrical signals;

loading four matrices of data, which correspond to the matrices of the Faddeev algorithm, into predetermined elements of the array of detector/accumulator elements;

optically computing the outer product of rows and columns of selected matrices divided by the negative value of the data contained in a preselected element of the array and adding these values to the previously stored values in accordance with the relationship $$X_{new}^{nm} = X_{old}^{nm} - ((X_{old}^{n1} \cdot X_{old}^{1m})/X_{old}^{11}),$$

and;

performing the optical computing operation on the data N−1 times, the resultant matrix produced thereby comprising the matrix $CA^{-1}B+D$, and wherein combinations of matrix multiplication, matrix inversion and matrix addition of the matrices A, B, C and D are achieved by appropriate selection of the data initially loaded into the matrices.

14. The method of claim 13 wherein said optical computing step comprises the steps of:

(a) uniformly modulating an optical beam along the direction of the rows of the matrices in response to the negative reciprocal of the signal located in the upper leftmost location of the array;

(b) spatially modulating the optical beam along the direction of the columns of the matrix in response to signals stored in the top row of the array;

(c) spatially modulating the optical beam along the direction of the rows in response to signals representing the signals stored in the left column of the array;

(d) integrating the modulated optical beam in the array; and (e) shifting the stored contents of the array one column to the left and one row to the top.

15. The method of claim 13 wherein said optical computing step comprises the steps of:

(a) uniformly modulating an optical beam along the rows of the matrix in response to the reciprocal of the signal located in the corner location of the array;

(b) uniformly modulating the optical beam along a predetermined column of the matrix in response to a constant signal corresponding to the number 1;

(c) spatially modulating the optical beam along the balance of the columns of the matrix in response to signals corresponding to the balance of the signals stored in the top row of the array;

(d) uniformly modulating the optical beam along a predetermined row of the matrix in response to a constant signal corresponding to the number −1;

(e) spatially modulating the optical beam along the balance of the rows in response to signals corresponding to the balance of the signals stored in the left column of the array;

(f) shifting the stored contents of the array one column to the left and one row to the top; and wherein the above optical computing steps provide the inverse of the matrix A loaded into said array.

16. Apparatus which processes four matrices of data A, B, C and D which computes the matrix $CA^{-1}B+D$, and which thus provides for matrix multiplication, matrix inversion, matrix addition and combinations thereof by appropriate selection of the data comprising said matrices, said apparatus comprising:

a light source which emits a two dimensional light beam along an optical path;

a plurality of light modulators sequentially disposed along the optical path, each modulator being adapted to modulate light incident thereupon along one dimension thereof, alternate modulators having an orthogonal orientation with respect to a prior modulator in the sequence;

an array of detector elements disposed along the optical path which is adapted to store electrical signals indicative of initializing data which is to be processed, receive light that is modulated by the modulators, convert the received light into corresponding electrical signals, combine the converted electrical signals with the initializing data, and store the combined electrical signals; and processing means coupled to the detector array and each of the light modulators, for initially loading data into the elements of the array, for sequentially coupling preselected signals comprising selected elements of data from the array to selected ones of the light modulators N−1 successive times in accordance with the relationship $$X_{new}^{nm}=X_{old}^{nm}-((X_{old}^{n1}\cdot X_{old}^{1m})/X_{old}^{11}),$$

the resultant matrix derived from sequentially processing the data N−1 times comprising the matrix $CA^{-1}C+D$, and wherein combinations of matrix multiplication, matrix inversion and matrix addition of the matrices A, B, C and D are achieved by appropriate selection of the data initially loaded into the matrices.

17. Apparatus which processes four matrices of data A, B, C and D which computes the matrix $CA^{-1}B+D$, and which thus provides for matrix multiplication, matrix inversion, matrix addition and combinations thereof by appropriate selection of the date comprising said matrices, said apparatus comprising:

a light source which emits a two dimensional light beam along an optical path;

a plurality of light modulators sequentially disposed along the optical path, each modulator being adapted to modulate light incident thereupon along one dimension thereof;

an array of detector elements disposed along the optical path which is adapted to store electrical signals indicative of initializing data which is to be processed, receive light that is modulated by the modulators, convert the received light into corresponding electrical signals, combine the converted electrical signals with the initializing data, and store the combined electrical signals; and processing means coupled to the detector array and each of the light modulators, for initially loading data into the elements of the array, for sequentially coupling preselected signals comprising selected elements of data from the array to selected ones of the light modulators N−1 successive times in accordance with the relationship $$X_{new}^{nm}=X_{old}^{nm}-((X_{old}^{n1}\cdot X_{old}^{1m})/X_{old}^{11}),$$

the resultant matrix derived from sequentially processing the data N−1 times comprising the matrix $CA^{-1}C+D$, and wherein combinations of matrix multiplication, matrix inversion and matrix addition of the matrices A, B, C and D are achieved by appropriate selection of the data initially loaded into the matrices.

* * * * *